US011294802B2

(12) United States Patent
Anaya et al.

(10) Patent No.: US 11,294,802 B2
(45) Date of Patent: *Apr. 5, 2022

(54) IDENTIFYING INCORRECT VARIABLE VALUES IN SOFTWARE TESTING AND DEVELOPMENT ENVIRONMENTS

(71) Applicant: INTERNATIONAL BUSINESS MACHINES CORPORATION, Armonk, NY (US)

(72) Inventors: Francisco M. Anaya, Hollister, CA (US); Tom C. L. Chen, Ontario (CA); Michael S. Fulton, Brackendale (CA); Trong Truong, Ontario (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 618 days.

This patent is subject to a terminal disclaimer.

(21) Appl. No.: 15/345,550

(22) Filed: Nov. 8, 2016

(65) Prior Publication Data

US 2018/0129596 A1    May 10, 2018

(51) Int. Cl.
*G06F 9/44* (2018.01)
*G06F 11/36* (2006.01)

(52) U.S. Cl.
CPC ...... *G06F 11/3692* (2013.01); *G06F 11/3688* (2013.01)

(58) Field of Classification Search
CPC ............. G06F 11/3612; G06F 11/3624; G06F 11/3688; G06F 11/3692
See application file for complete search history.

(56) References Cited

U.S. PATENT DOCUMENTS

| 7,174,536 | B1 | 2/2007 | Kothari et al. |
| 7,739,664 | B2 | 6/2010 | Bates et al. |
| 7,747,987 | B1* | 6/2010 | Akarte ............... G06F 11/3688 |
| | | | 702/179 |
| 8,239,843 | B2 | 8/2012 | Song et al. |

(Continued)

OTHER PUBLICATIONS

IBM: List of IBM Patents or Patent Applications Treated as Related (Appendix P), May 2, 2018, pp. 1-2.

(Continued)

*Primary Examiner* — Chat C Do
*Assistant Examiner* — Lenin Paulino
(74) *Attorney, Agent, or Firm* — Anthony Curro (57) ABSTRACT

A test suite is executed to test a computer program for a plurality of variables. A variable value is generated for each variable of the plurality of variables at a predetermined location of the computer program. Whether a test included in the test suite is successful is determined. If the test is successful, the variable value is recorded as part of a success value set. If the test is not successful, the variable value is recorded as part of a failure value set. A confidence metric is calculated for the variable value. A relevance metric for each variable of the plurality of variables is measured, based on a Jaccard distance between the success value set and the failure value set. The failure value set, the success value set, the confidence metric for the variable value, and the relevance metric for each variable of the plurality of variables are presented.

9 Claims, 8 Drawing Sheets

(56) References Cited

U.S. PATENT DOCUMENTS

| | | | | |
|---|---|---|---|---|
| 2009/0144698 | A1* | 6/2009 | Fanning | G06F 8/75 717/120 |
| 2011/0154300 | A1* | 6/2011 | Rao | G06F 11/3624 717/133 |
| 2011/0258601 | A1* | 10/2011 | Ndem | G06F 11/3676 717/124 |
| 2012/0117041 | A1* | 5/2012 | Rodriguez | G06F 11/362 707/702 |
| 2012/0151453 | A1* | 6/2012 | Finking | G06F 11/3612 717/130 |
| 2013/0283243 | A1* | 10/2013 | Bates | G06F 11/3624 717/129 |
| 2014/0365990 | A1* | 12/2014 | Nakao | G06F 8/71 717/101 |
| 2015/0261596 | A1 | 9/2015 | Muthukumsarasamy et al. | |
| 2017/0208094 | A1* | 7/2017 | Hollingshead | H04L 63/20 |

OTHER PUBLICATIONS

Wu et al., "CrashLocator: Locating Crashing Faults Based on Crash Stacks", Jul. 21-25, 2014, pp. 1-11.

Mell et al., "The NIST Definition of Cloud Computing", National Institute of Standards and Technology, Special Publication 800-145, Sep. 2011, pp. 1-7.

\* cited by examiner

IDENTIFYING INCORRECT VARIABLE VALUES IN SOFTWARE TESTING AND DEVELOPMENT ENVIRONMENTS

BACKGROUND

The present invention relates generally to the field of software product development, and more particularly to identifying incorrect variable values in a software program or application that may result in software bugs (e.g., errors or other defects).

Software development and testing environments may implement a set of processes and programming tools to investigate a software product. Typically, users of software development, testing and production environments (e.g., software product developers) may use a program logs, crash reports, and debuggers to investigate the quality of a software program or application.

SUMMARY

Embodiments of the present invention provide systems, methods, and computer program products for identifying incorrect variable values in software testing and development environments. A test suite is executed to test a computer program for a plurality of variables. A variable value is generated for each variable of the plurality of variables at a predetermined location of the computer program. Whether a test included in the test suite is successful is determined. Responsive to determining that the test is successful, the variable value is recorded as part of a success value set. Responsive to determining the test is not successful, the variable value is recorded as part of a failure value set. A confidence metric is calculated for the variable value, wherein the confidence metric indicates a level of certainty in the correctness of the variable value. A relevance metric for each variable of the plurality of variables is measured, based on a Jaccard distance between the success value set and the failure value set. The failure value set, the success value set, the confidence metric for the variable value, and the relevance metric for each variable of the plurality of variables are presented.

DETAILED DESCRIPTION

Typically, a software developer may write source code in a computer programming language to specify functions to be performed by a computer. An executable program or file includes machine code that may be executed by a computer to perform specified functions according to encoded instructions. In computer programming, a variable is a storage location paired with a symbolic name, such as an identifier, which contains some known or unknown quantity of information, which is referred to as the variable value. For example, the identifier in source code may be bound (e.g., reference) to a variable value during run time, and the variable value may change during the duration of program execution.

In certain instances, during program execution, software program or application bugs or defects may arise due to incorrect variable values that are relied upon by the source code. Typically, software development and testing environments may implement program logs, crash reports, and debuggers to assist software developers in reporting lists of variable values. However, typically it is the responsibility of the software developers to manually determine which of the listed variables contain incorrect values and which of the listed variables may result in software bugs and/or defects. This process may be burdensome and tedious in instances where software programs use a large number of variables.

Embodiments of the present invention may assist a user of a software development and testing environments to identify incorrect variable values. Embodiments of the present invention may be implemented by the user of the software development and testing environments to process crash reports and identify which variables may have caused a software program crash. Furthermore, embodiments of the present invention may provide a filtered set of variables with possible incorrect variable values during a debugging process.

Figure 1A:
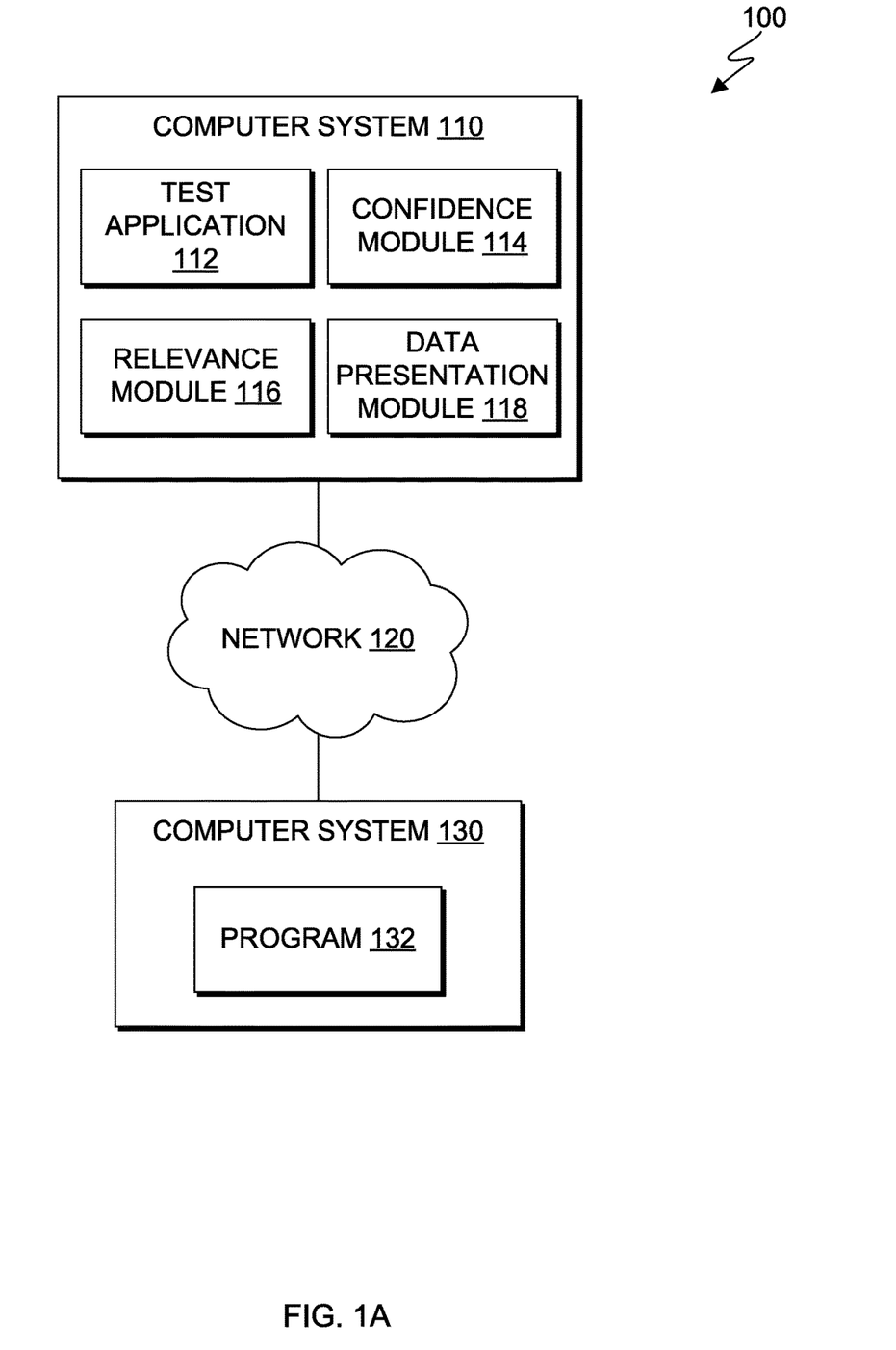
FIG. 1A is a functional block diagram illustrating a software development and testing environment, in accordance with an embodiment of the present invention.

FIG. 1A is a functional block diagram illustrating software development and testing environment 100, in accordance with an embodiment of the present invention. Software development and testing environment 100 may be a distributed testing environment, including computer system 110 and computer system 130, connected over network 120. In one example, computer system 110 and computer system 130 may be used in data center, cloud computing, storage area network (SAN), and network attached storage (NAS) applications. In certain embodiments, computer system 110 and computer system 130 represent virtual machines. In general, computer system 110 and computer system 130 are representative of any electronic devices, or combination of electronic devices, capable of executing machine-readable program instructions, in accordance with an embodiment of the present invention, as described in greater detail with regard to FIG. 5. In other embodiments, computer system 110 and computer system 130 may be implemented in a cloud computing environment, as described in greater detail with regard to FIGS. 6 and 7.

Network 120 may be, for example, a local area network (LAN), a wide area network (WAN) such as the Internet, or a combination of the two, and include wired, wireless, or fiber optic connections. In general, network 120 may be any combination of connections and protocols that will support communications between computer system 110 and computer system 130, in accordance with an embodiment of the invention.

Computer system 130 represents a platform configured to store, compile, and execute source code for program 132. Computer system 130 may be a desktop computer, a laptop computer, a specialized computer server, or any other computer system known in the art. In certain embodiments, computer system 130 represents a computer system utilizing clustered computers and components to act as a single pool of seamless resources when accessed through network 120.

Program 132 represents a software program that a user of software development and testing environment 100 manages. For example, a user of software development and testing environment 100 may use computer system 130 to create, modify, and/or debug program 132. In another embodiment, program 132 may be a part of computer system 110. In yet another embodiment, portions of program 132 source code may be distributed between more than one computer system 130 (not depicted), such as part of a distributed compiling/testing environment. In general, program 132 includes variables at various program locations, such as function entries, function exits, and write statements.

Computer system 110 represents a platform configured to test program 132 and present data generated from testing program 132 to a user (e.g., a software developer) of computer system 110. Computer system 110 may be a desktop computer, a laptop computer, a specialized computer server, or any other computer system known in the art. In certain embodiments, computer system 110 represents a computer system utilizing clustered computers and components to act as a single pool of seamless resources when accessed through network 120. In this embodiment, computer system 110 includes test application 112, confidence module 114, relevance module 116, and data presentation module 118. In one embodiment, computer system 110 may include a system of record, such as a storage repository (not depicted).

Test application 112 represents a software program or application that is used to test program 132. Test application 112 may include a collection of test cases or test scripts, such as a test suite, where each test case may be a set of conditions under which a determination of whether program 132 or one of its features is working as it was intended. For example, test application 112 may utilize a test oracle to determine whether program 132 passes or fails a particular test case. In this example, the utilization of the test oracle may involve comparing the output(s) of program 132 during testing for the particular test case, to the output(s) that the test oracle determines that program 132 should output (i.e., actual output compared to expected output). Furthermore, the outputs that are compared to determine whether program 132 passes or fails a particular test case may be the variable values from variables in each program location of program 132, which include but are not limited to, function entries, function exits, and write statements. In one embodiment, tests executed by test application 112 may test the source code of program 132 line-by-line, such that each line of source code is tested or analyzed with respect to a particular test before testing on a next line of source code with respect to the particular test. In this manner, test application 112 may encounter portions of source code that include assertion statements, function entries, function exits, and write statements, as described in greater detail below. For example, after testing the first five lines of the source code for program 132, if test application 112 determines that the sixth line includes an assertion statement, then test application 112 indicates that an assertion statement is encountered, as subsequent processing and analysis is required.

In this embodiment, test application 112 is executed to test program 132 and determine whether program 132 passes or fails a particular test case. Each test, test case, or test script used by test application 112 to test program 132 generates zero or more variable values for each variable at each program location of program 132. If test application 112 determines that program 132 passes a particular test case (e.g., a test is successful), then the variable values at all program locations of program 132 observed, or generated, during the testing are identified as successful variable values. Accordingly, the successful variable values are recorded in the system of record of computer system 110 and are labeled, or identified, as success variable values. If test application 112 determines that program 132 fails a particular test case (e.g., a test is not successful), then the variable values at all program locations of program 132 observed during the testing are identified as failure variable values. Accordingly, the failure variable values are recorded in the system of record of computer system 110 and are labeled, or identified, as success variable values. After test application 112 completes necessary testing of program 132, failure variable values which were recorded in the system of record are aggregated and grouped into a failure value set. Similarly, success variable values which were recorded in the system of record are aggregated and grouped into a success value set. In one embodiment, completion of necessary testing of program 132 occurs when a specified number of test cases, test scripts, or other tests are executed by test application 112 to test program 132 (e.g., user specified, program specified, system specified, etc.). In another embodiment, completion of testing of program 132 occurs when all required test cases, test scripts, or other tests that are identified for execution are executed by test application 112 to test program 132, where the required test cases, test scripts, or other tests may be previously identified by the user based on quality assurance guidelines and policies.

Test application 112 is also configured to determine if a test succeeds (i.e., program 132 operates as intended). For example, test application 112 can utilize a test oracle as a mechanism for determining whether program 132 passed or failed a particular test case or test script. In this embodiment, when all the tests are completed, the success values at each variable at each program location from all the tests are aggregated to produce a success value set for each variable at each program location. Similarly, when all the tests are completed, the failure values at each variable at each program location from all the tests are aggregated to produce a failure value set for each variable at each program location. Furthermore, a number of occurrences for each variable value is also counted and stored in the system of record, as described in greater detail below.

It should be understood that, more than one test may be executed by test application 112 to test program 132, and that each test may provide different outcomes (e.g., pass or fail) independent of another test. For example, if a first test executed by test application 112 for program 132 succeeds, then all of the variable values at all program location of program 132 that were observed during the first test are recorded as success variable values in the system of record. In this example, if a second test executed by test application 112 for program 132 fails, then all of the variable values at all program location of program 132 that were observed during the second test are recorded as failure variable values. Furthermore, a portion of the variable values observed during the first and second test for a particular variable may be included in the success variable values identified based on the outcome of the first test, and the portion of the variable values for the particular variable also may be included in the failure variable values identified based on the outcome of the second test.

Failure value sets, success value sets and variable values included in each value set may have different properties. For example, variable values that are not part of a success value set can be identified as potential causes for software bugs. In this example, the variable values that are not part of a success value set may be part of a failure value set, or may be excluded from both a failure value set and success value set (i.e., the variable values were not observed during testing). In another example, variable values included in a success value set that have low occurrences may be identified as potential causes for software bugs. In another example, variable values included in a failure value set may be either distinct (i.e., include variable values that are not part of any other type of value set) or overlap with one or more variable values included in a success value set. In yet another example, a variable value that is included in both the success value may be identified as a variable value having low relevance, as described in greater detail below.

Confidence module 114 represents a software program or application configured to manage confidence counters for observed variable values during testing of program 132 and determine confidence metrics based on the confidence counters. Confidence module 114 may implement a formula for determining a confidence metric of a variable value for a particular variable at a program location of program 132, where the formula involves summing the total number of occurrences for the variable value with the confidence counter for the variable value. Furthermore, a confidence metric may provide an indication of how certain (i.e., a level of certainty) confidence module 114 is with respect to the completeness and correctness of the observed variable values. In one embodiment, the confidence in the completeness and correctness of the variable values increases with more samples. In this embodiment, when a variable value of a particular variable at a program location of program 132 is first observed during testing, confidence module 114 assigns a confidence counter the observed variable value. Furthermore, the confidence counter is incremented or not incremented based on various determinations involving assertion statements and whether identified variable values are within a scope of encountered function exits, function entries, and/or write statements, as described in greater detail with regard to FIG. 2. An assertion statement is a statement that a predicate (e.g., Boolean-valued function, a true-false expression, etc.) is expected to always be true when the assertion statement is encountered. For example, if an assertion statement evaluates to false at program 132 runtime, an assertion failure may result, which typically causes program 132 to crash, or throw an assertion exception. A "scope," as used herein refers the availability of a particular variable to the source code of program 132, where the scope can vary as little as a single expression or function (i.e., local scope) to as much as the entire program 132 (i.e., global scope). For example, as FIG. 2 describes, confidence module 114 determines whether particular variable values are within a local function scope of a function entry, function exit, and/or write statement. In another embodiment, confidence module 114 determines a range of variable values are within a confidence level for an acceptable variable value for a particular variable at a program location of program 132, where an acceptable variable value may be a variable value that is identified as a relatively low likelihood of causing program 132 to not operate as intended.

Relevance module 116 represents a software program or application configured to determine the relevance of a variable during testing of program 132. In one embodiment, relevance module 116 may calculate a Jaccard distance to determine the relevance of a variable. In example embodiments using the Jaccard distance, relevance of a variable may be calculated by dividing the difference of the sizes of a union and the intersection of a failure value set and success value set by the size of the union. Furthermore, if S is a success value set, and F is a failure value set, then relevance module 116 may calculate relevance by performing the following calculation: $(|S \cup F| - |S \cap F|)/|S \cup F|$. In one embodiment, the relevance, or relevance metric, calculated by relevance module 116 may range between 0 and 1. Accordingly, a relevance metric with a value of 1 indicates that the success value set and the failure value set are completely disjoint (i.e., the variable at that particular program location is very relevant) and a relevance metric with a value of 0 indicates that the success value set and the failure value set intersect completely (i.e., the variable at that program location provide no useful information). It should be understood that relevance module 116 calculates the relevance, or a relevance metric, for variables at each program location to determine whether variable values provide information as to whether the variable may cause software bugs or defects.

Data presentation module 118 represents a software program or application configured to present to a user of computer system 110 testing information, as described in greater detail below. For example, data presentation module 118 may provide a user interface for editing content (i.e., source code), debugger variable filtering, and crash report analysis, as described in greater detail with regard to FIG. 3.

Figure 1B:
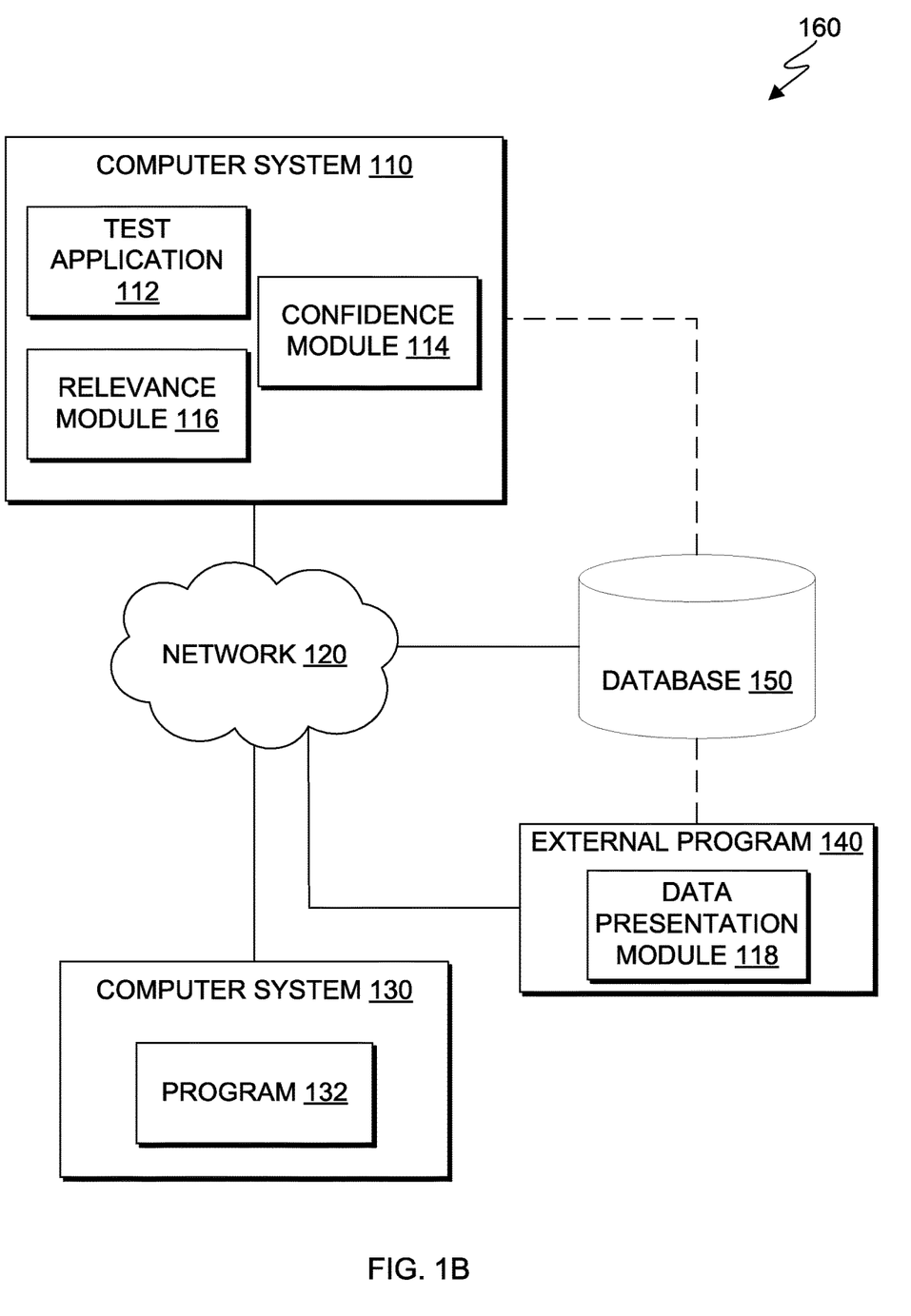
FIG. 1B is a functional block diagram illustrating another implementation of a software development and testing environment, in accordance with an embodiment of the present invention.
Figure 3:
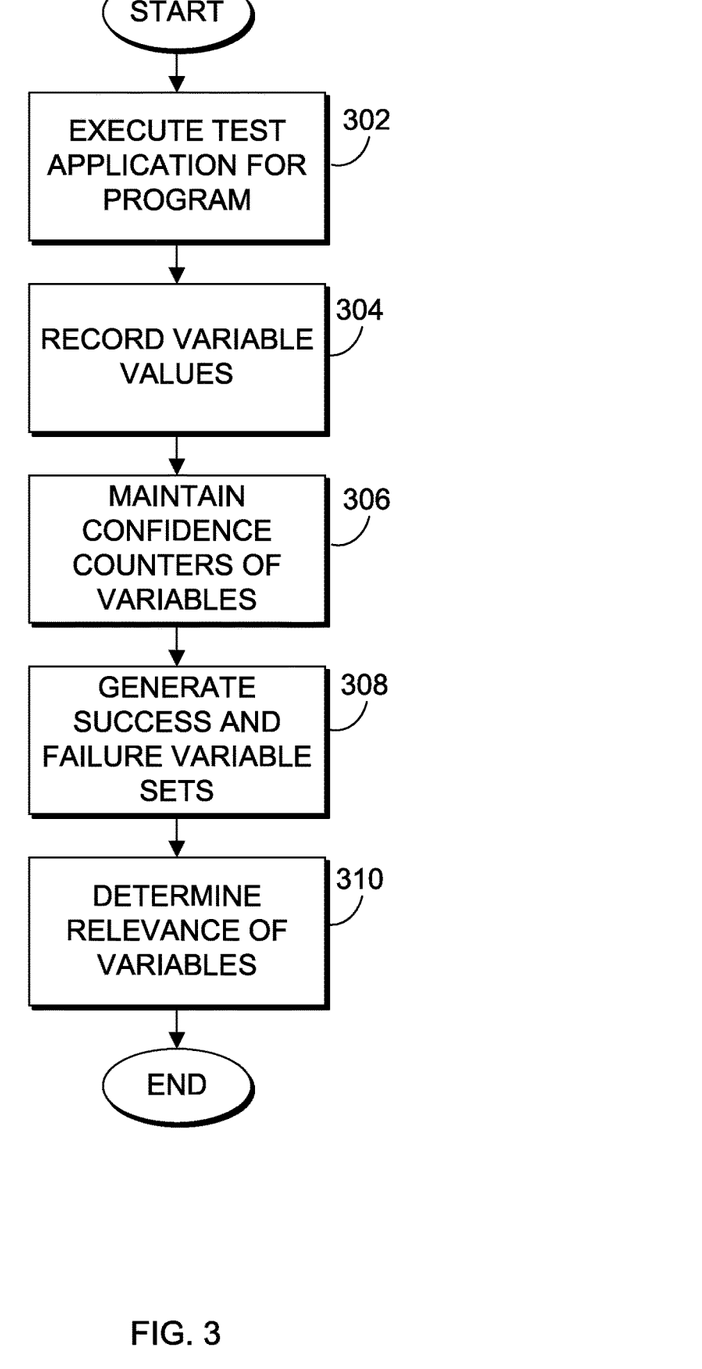
FIG. 3 is a flowchart illustrating operational steps for collecting and processing program variable value information, in accordance with an embodiment of the present invention.

FIG. 1B is a functional block diagram illustrating another implementation of software development and testing environment 160, in accordance with an embodiment of the present invention. In this embodiment, data generated from test application 112, confidence module 114 and relevance module 116 are stored in database 150 or another system of record. Data presentation module 118 and its sub-components, which are described in greater detail with regard to FIG. 3, are integrated into external program 140, or another external software product, such as a debugger, editor and/or fault analyzer. During operation of external program 140, data presentation module 118 and its sub-components access database 150 to retrieve the variable value data and present them in a computer system (not depicted) operating external program 140.

Figure 2:
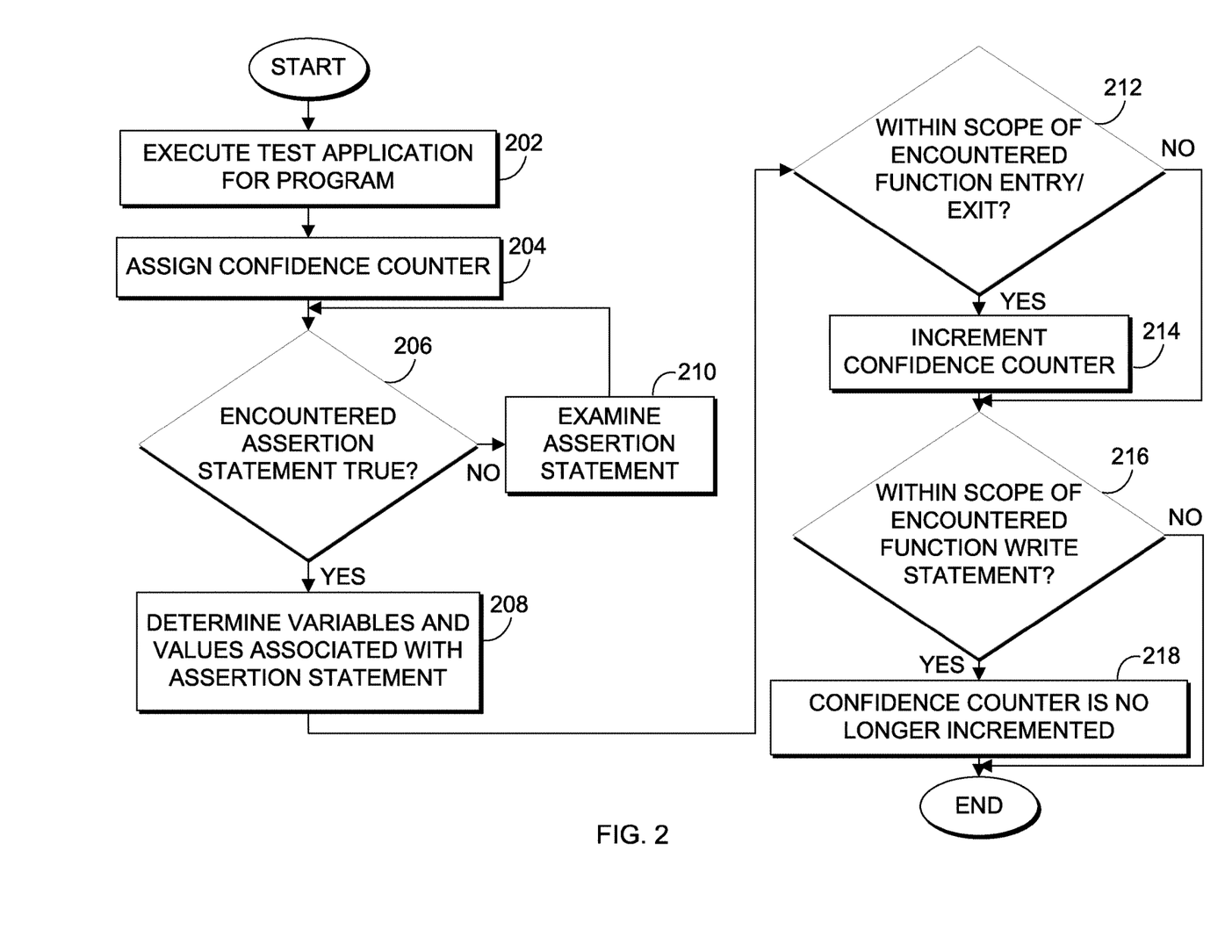
FIG. 2 is a flowchart illustrating operational steps for managing a confidence counter during testing of a program.

FIG. 2 is a flowchart illustrating operational steps for managing a confidence counter during testing of program 132. Test application 112 is executed to test program 132 (step 202). In this embodiment, test application 112 executes a number of tests, test cases, and/or test scripts as part of a test suite to test program 132. In one embodiment, test application 112 can execute any number of pre-specified and/or pre-identified tests to test program 132 until necessary testing is complete.

Confidence module 114 assigns a confidence counter for each variable value observed during testing of program 132 (step 204). In this embodiment, when a variable value of a particular variable at a program location of program 132 is first observed during testing, confidence module 114 assigns a confidence counter of the observed variable value. In one embodiment, the confidence counter may be considered a type of memory that stores a single natural number, which is initially set a value equal to zero. For example, at a first line of source code for program 132, if test application 112 determines that a first variable is declared based on an analysis of the source code structure, then confidence module 114 may assign a confidence counter for each of the variable values of the first variable that are observed during testing.

As previously discussed in FIG. 1, test application 112 may determine that a portion of source code for program 132 that is undergoing testing includes an assertion statement (i.e., an assertion statement is encountered). If an assertion statement is encountered, then the assertion statement is executed to determine whether the expression of the assertion statement evaluates to true or false. As previously described, an assertion statement is a statement that a predicate (e.g., Boolean-valued function, a true-false expression, etc.) is expected to always be true when the assertion statement is encountered. Accordingly, confidence module 114 determines whether the expression of the assertion statement evaluates to true (decision 206).

If confidence module 114 determines that the expression evaluates to true ('yes' branch, decision 206), then confidence module 114 determines, or identifies, the variables contained, or associated with, in the expression and the set of variable values that result in the expression to evaluate to true (step 208). In one embodiment, confidence module 114 may identify the one or more variables relied upon by the assertion statement, and then identify the set of variable values for the one or more variables that result in the expression of the assertion statement to evaluate to true.

If the assertion statement is executed and the expression is evaluated to false ('no' branch, decision 206), then confidence module 114 examines the assertion statement (step 210). In one embodiment, examining the assertion statement may further involve transforming the expression to its logical negation, then determine, or identify, the variables contained, or associated with, in the logical negation of the expression and the set of variable values that cause the logical negation expression to evaluate to true (i.e. an expression which evaluates to false is equal to the logical negation of the expression which evaluates to true). Furthermore, after determining, or identifying, which variables and variable values are associated with the expression or a logical negation of the expression, then confidence module 114 may permit testing of program 132 to proceed.

As program 132 continues to undergo testing by test application 112, function entries, function exits, and/or write statements may be encountered. In one embodiment, if a function entry or function exit is encountered, then confidence module 114 may determine whether the variables associated with the expression of the assertion statement or logical negation of the expression of the assertion statement are within a scope of the function entry or function exit (decision 212). In one embodiment, confidence module 114 may identify all of the local variables that are within the local scope of the function entry or function exit, and compare the identified local variables with the variables associated with the expression of the assertion statement or logical negation of the expression of the assertion statement.

If confidence module 114 determines that a variable associated with the expression of the assertion statement or logical negation of the expression of the assertion statement is within a scope of an encountered function entry or function exit ('yes' branch, decision 212), then confidence module 114 increments a confidence counter for the variable value (step 214). It should be understood that, if more than one variable associated with the expression of the assertion statement or logical negation of the expression of the assertion statement is within a scope of an encountered function entry or function exit, then confidence module 114 increments a confidence counter for each of the variable values associated with each of the more than one variables. In one embodiment, if confidence module 114 determines that the all of the variables associated with the expression of the assertion statement or logical negation of the expression of the assertion statement are included in the identified local variables from the encountered function entry or function exit, then confidence module 114 determines that the at least one variable associated with the expression of the assertion statement or logical negation of the expression of the assertion statement is within the scope of an encountered function entry or function exit.

If confidence module 114 determines that a variable value associated with the expression of the assertion statement or logical negation of the expression of the assertion statement is not within a scope of an encountered function entry or function exit ('no' branch decision 212), then operational steps proceed to decision 216. In one embodiment, if confidence module 114 determines that the at least one of the variables associated with the expression of the assertion statement or logical negation of the expression of the assertion statement is not included in the identified local variables from the encountered function entry or function exit, then confidence module 114 determines that the at least one variable associated with the expression of the assertion statement or logical negation of the expression of the assertion statement is not within the scope of an encountered function entry or function exit.

In certain embodiments, a write statement may be encountered while testing program 132. For example, at a tenth line of source code for program 132, if confidence module 114 determines that a write statement is included in the tenth line of source code, based on an analysis of the source code structure, then confidence module 114 may determine that a write statement has been encountered. If a write statement is encountered, then confidence module 114 determines whether a variable associated with the expression of the assertion statement or logical negation of the expression of the assertion statement is within a scope of the encountered write statement (decision 216). In one embodiment, if confidence module 114 determines that the all of the variables associated with the expression of the assertion statement or logical negation of the expression of the assertion statement are included in identified local variables from the encountered write statement, then confidence module 114 determines that the at least a variable associated with the expression of the assertion statement or logical negation of the expression of the assertion statement is within the scope of the encountered write statement.

If confidence module 114 determines that the variable associated with the expression or logical negation of the expression of the assertion statement is within a scope of the encountered write statement ('yes' branch, decision 216), then confidence module 114 no longer increments the confidence counter for variable values associated with the variable (step 218). In one embodiment, if confidence module 114 determines that the variable associated with the expression or logical negation of the expression of the assertion statement is within a scope of the encountered write statement, then the confidence counters for variable values associated with the variable may be no longer incremented even if the variable values are relied upon in subsequent lines of source code of program 132.

FIG. 3 is a flowchart illustrating operational steps for collecting and processing variable value information, in accordance with an embodiment of the present invention. Test application 112 is executed to test program 132 (step 302). Each variable value that is observed during the testing of program 132 is recorded as a success or a failure, based on an outcome of the test.

Test application 112 records variable values as well as an occurrence for each value (step 304). For example, if a particular variable value is observed three times during testing of program 132, then test application 112 may store in a system of record that three occurrences of the particular variable have been observed. In one embodiment, recording variable values during testing may be performed by pre-defining program locations before testing program 132, such as by injecting trace statements at program locations, or by using hardware storage change detection and trapping to signal variable value changes for recording.

Afterwards, confidence module 114 maintains confidence counters for each observed variable, as previously discussed with regard to FIG. 2 (step 306). Test application 112 may then aggregate the variables, variable values, confidence counters for each observed variable, and classify each variable as a success or failure, based on the outcome of a respective test. Accordingly, test application 112 generates success and failure value sets (step 308).

Relevance module 116 uses the generated success and failure value sets to determine the relevance, or relevance metric, of each observed variable (step 310). As previously described, relevance module 116 may determine the relevance of an observed variable by calculating a Jaccard distance. For example, relevance of a variable may be calculated by dividing the difference of the sizes of a union and the intersection of a failure value set and success value set by the size of the union. Furthermore, if S is a success value set, and F is a failure value set, then relevance module 116 may calculate relevance by performing the following calculation: $(|S \cup F| - |S \cap F|)/|S \cup F|$.

A value for a relevance metric can range between 0 and 1. A relevance metric with a value of 1 indicates that the success value set and the failure value set are completely disjoint, such that a relatively low number of variable values included in the success value set overlap with variable values included in the failure value set. Accordingly, relevance module 116 may indicate that a variable at a program location of program 132 that is associated with the variable values included in the failure value set is relevant to the user (e.g., developer), because the variable values included in the failure value set which are completely disjoint from the variable values of the success value set are potential causes for program 132 bugs and defects.

In contrast, a relevance metric with a value of 0 indicates that the success value set and the failure value set completely intersect, such that a relatively high number of variable values included in the success value set overlap with variable values included in the failure value set. Accordingly, relevance module 116 may indicate that a variable at a program location of program 132 that is associated with variable values included in both the failure value set and success value set is not relevant to the user, or that the variable at that program location provide no useful information regarding identifying potential causes for program 132 bugs and defects.

Figure 4:
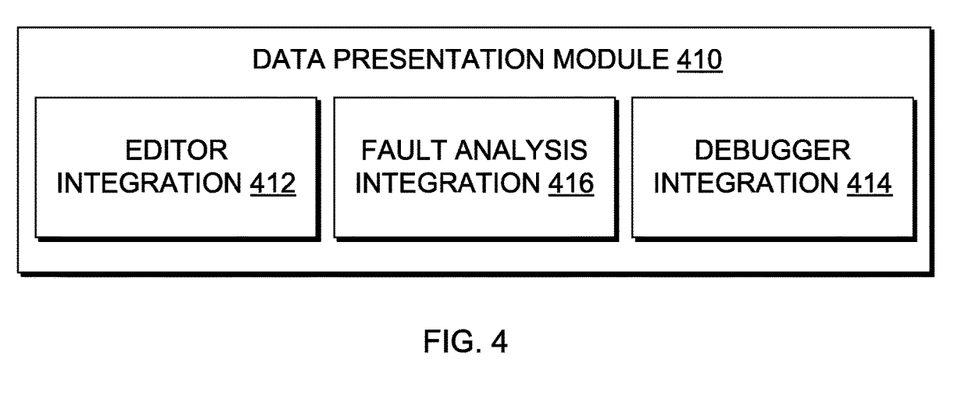
FIG. 4 is a functional block diagram illustrating various techniques to present program variable value information, in accordance with an embodiment of the present invention.

FIG. 4 is a functional block diagram illustrating various techniques to present variable value information, in accordance with an embodiment of the present invention. In this embodiment, data presentation module 410 represents a software program or application similar to data presentation module 118, as previously described with regard to FIGS. 1A and 1B. Data presentation module 410 may be configured to integrate several modules, such as editor integration module 412, fault analysis integration module 416, and debugger integration module 414. In another embodiment, editor integration module 412, fault analysis integration module 416, and debugger integration module 414 may be part of a separate program or application that are integrated in an external software product, as previously described in FIG. 1B.

When a user (e.g., a developer) of an external source editor, with editor integration module 412, editor integration module 412 may provide functionality to send a function/method signature, class signature, and a file signature to the system of record (i.e., database 150 in FIG. 1B) to query for success/failure value sets, confidence counters, and relevance data of variables that are at the current source location. In one embodiment, editor integration module 412 may display in the external editor with a separate variable view, such that each variable view consists of a variable name, success variable values, confidence of success variable values, failed variable values, confidences of failure variable values, relevance of each observed variable. Furthermore, a variable view provided by editor integration module 412 may provide filtering capabilities for variables with respect to a confidence and/or a relevance threshold. For example, if a developer wants to focus on variables that are highly relevant (i.e., variable values that have the highest potential to cause software bugs/defects), then the developer may elect to only view variables that have a relevance threshold of 0.9, such that only variables with a relevance greater or equal to 0.9 are displayed in the variable view. In another embodiment, the variable view may also provide the function to enter feedback. For example, if a developer discovers that a variable is not as relevant as the view or relevance for the variable indicates, then editor integration module 412 may be configured to send a new relevance value for the variable to relevance module 116 to update the relevance metric for the specified variable.

When a user (e.g., a developer) of an external bugger (e.g., external program 140 of FIG. 1B), with debugger integration module 414 integrated, debugger integration module 414 may provide functionality to query stored testing information with respect to a program location closest, but immediately prior to the current location (i.e., observed location). For example, the recorded program locations may be at a first and fifth line for a function in the source code for program 132. In this example, if the external bugger suspends program 132 testing at line four of the source code, then the closest recorded program location is the first line. The query submitted by debugger integration module 414 may return the success/failure value sets, occurrence for each variable value in each set, as well as confidence and relevance data.

In certain embodiments, occurrence for each variable value in the success/failure value sets may be normalized by debugger integration module 414. For example, a normalized occurrence may be calculated by dividing a number of occurrences of a variable value for a particular variable by the total number of occurrences of the particular variable. For each variable, the current variable value is compared with the recorded success/failure value sets. Accordingly, a variable is flagged as a potential bug by debugger integration module 414 if: a current variable value is in the failure value set, a current variable value does not exist in the success value set, and/or a current variable value is equal to one of the variable values in the success value set with a low normalized occurrence (e.g., 0.01). A threshold for low normalized occurrence may be provided by a user interacting with debugger integration module 414.

In one embodiment, debugger integration module 414 may consist of a variable view, similar to the variable view described with respect to editor integration module 412. Furthermore, after debugger integration module 414 compares variable values, debugger integration module 414 may notify the developer of all flagged variables. For example, the notification may be performed by highlighting all flagged variables and their corresponding variable values in the variable view. Accordingly, the developer may have access to incorrect variable values more effectively via the notification provided by debugger integration module 414.

When program 132 undergoes an unexpected operational termination during testing or operational runtime (i.e., crashes), fault analysis integration module 416 may record variable values for each stack frame at the point of failure. For each stack frame, fault analysis integration module 416 may query for testing data at the program location closest but immediately prior to the stack frame's program location (i.e., immediately preceding). The query may return failure/success value sets, occurrences of each variable value, confidence and relevance data. Similar to debugger integration module 414, occurrences may be normalized by fault analysis integration module 416. Accordingly, a variable is flagged as a potential cause of the crash by fault analysis integration module 416 if: a reported variable value is in the failure value set, a reported variable value does not exist in the success value set, and/or a reported variable value is equal to one of the variable values in the success value set with a low normalized occurrence. Furthermore, similar to debugger integration module 414, fault analysis integration module 416 may provide notifications to the developer, such that the developer has near-real time access to a list of variables corresponding variable values that may have caused the crash. Accordingly, the developer may utilize information provided by fault analysis integration module 416 to more effectively identify which stack frame and variable may have caused program 132 to crash.

Figure 5:
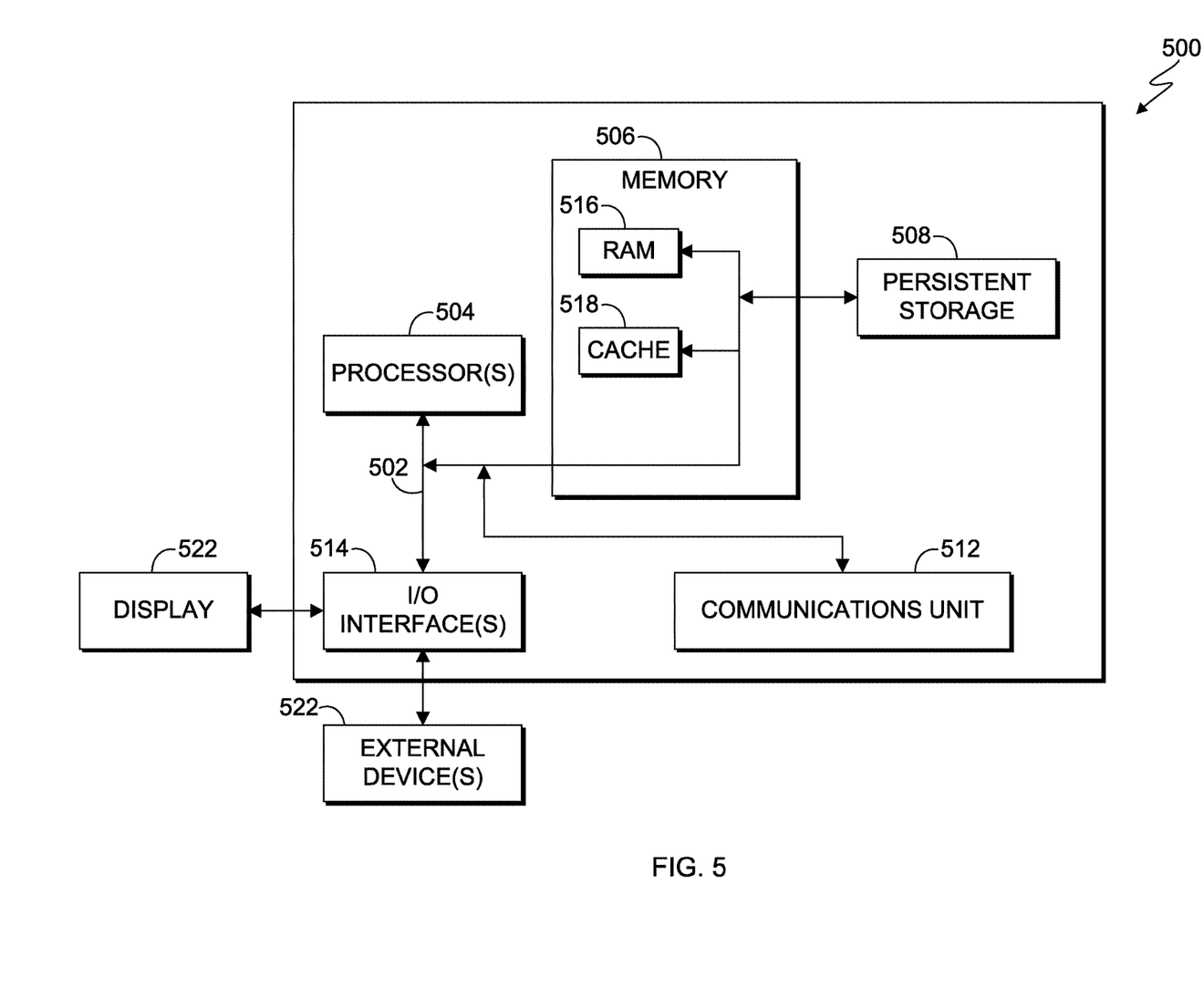
FIG. 5 is a block diagram of internal and external components of the computer systems of FIGS. 1A and 1B, in accordance with an embodiment of the present invention.

FIG. 5 is a block diagram of internal and external components of a computer system 500, which is representative the computer systems 110 and 130 of FIGS. 1A and 1B, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 may be implemented with any architecture designed for passing data and/or control information between processors (such as microprocessors, communications and network processors, etc.), system memory, peripheral devices, and any other hardware components within a system. For example, communications fabric 502 may be implemented with one or more buses.

Memory 506 and persistent storage 508 are computer-readable storage media. In this embodiment, memory 506 includes random access memory (RAM) 516 and cache memory 518. In general, memory 506 may include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 may include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network may comprise, for example, copper wires, optical fibers, wireless transmission, routers, firewalls, switches, gateway computers and/or edge servers. Software and data used to practice embodiments of the present invention may be downloaded through communications unit 512 (e.g., via the Internet, a local area network or other wide area network). From communications unit 512, the software and data may be loaded onto persistent storage 508.

One or more I/O interfaces 514 allow for input and output of data with other devices that may be connected to computer system 500. For example, I/O interface 514 may provide a connection to one or more external devices 520, such as a keyboard, computer mouse, touch screen, virtual keyboard, touch pad, pointing device, or other human interface devices. External devices 520 may also include portable computer-readable storage media such as, for example, thumb drives, portable optical or magnetic disks, and memory cards. I/O interface 514 also connects to display 522.

Display 522 provides a mechanism to display data to a user and may be, for example, a computer monitor. Display 522 may also be an incorporated display and may function as a touch screen, such as a built-in display of a tablet computer.

Figure 6:
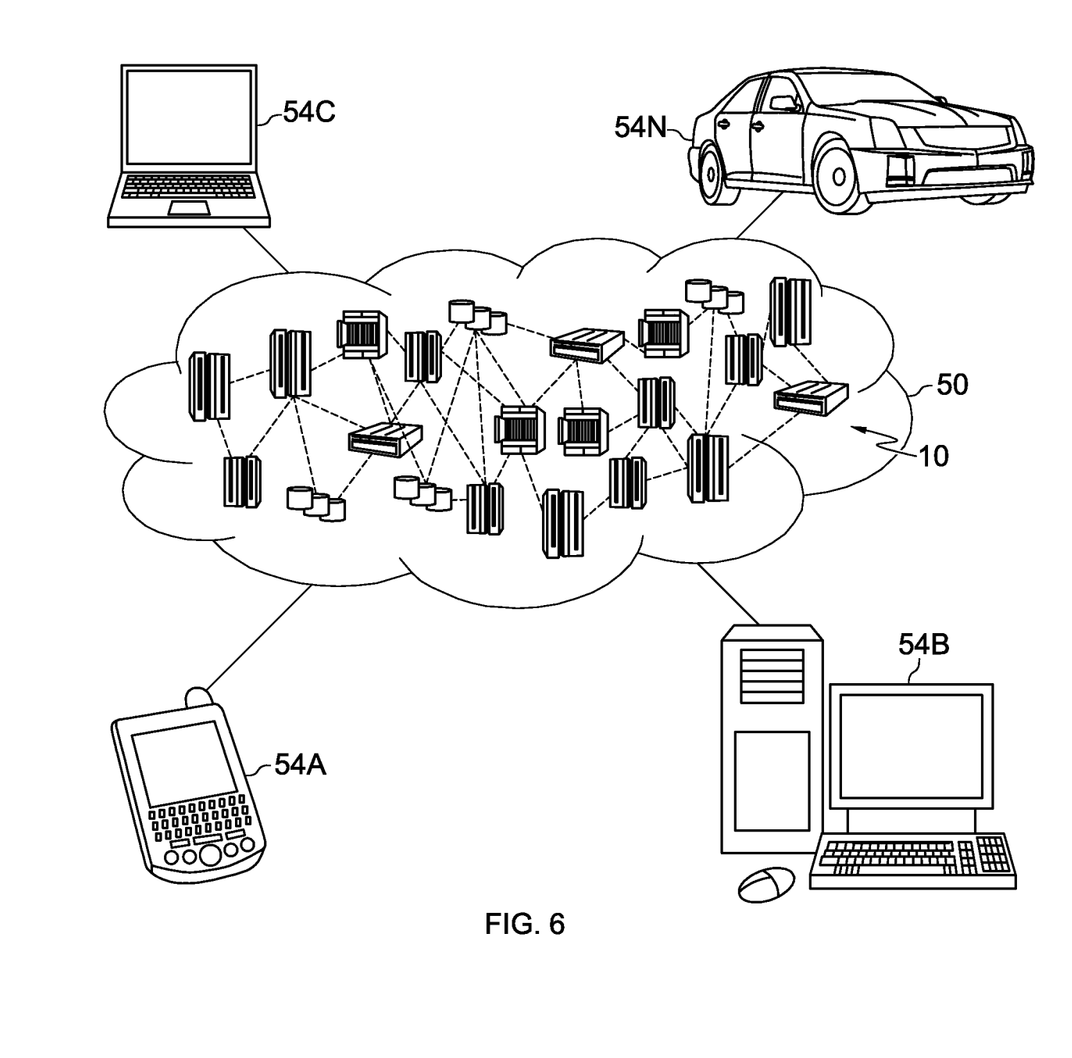
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 9 are intended to be illustrative only and that cloud computing nodes 10 and cloud computing environment 50 may communicate with any type of computerized device over any type of network and/or network addressable connection (e.g., using a web browser).

Figure 7:
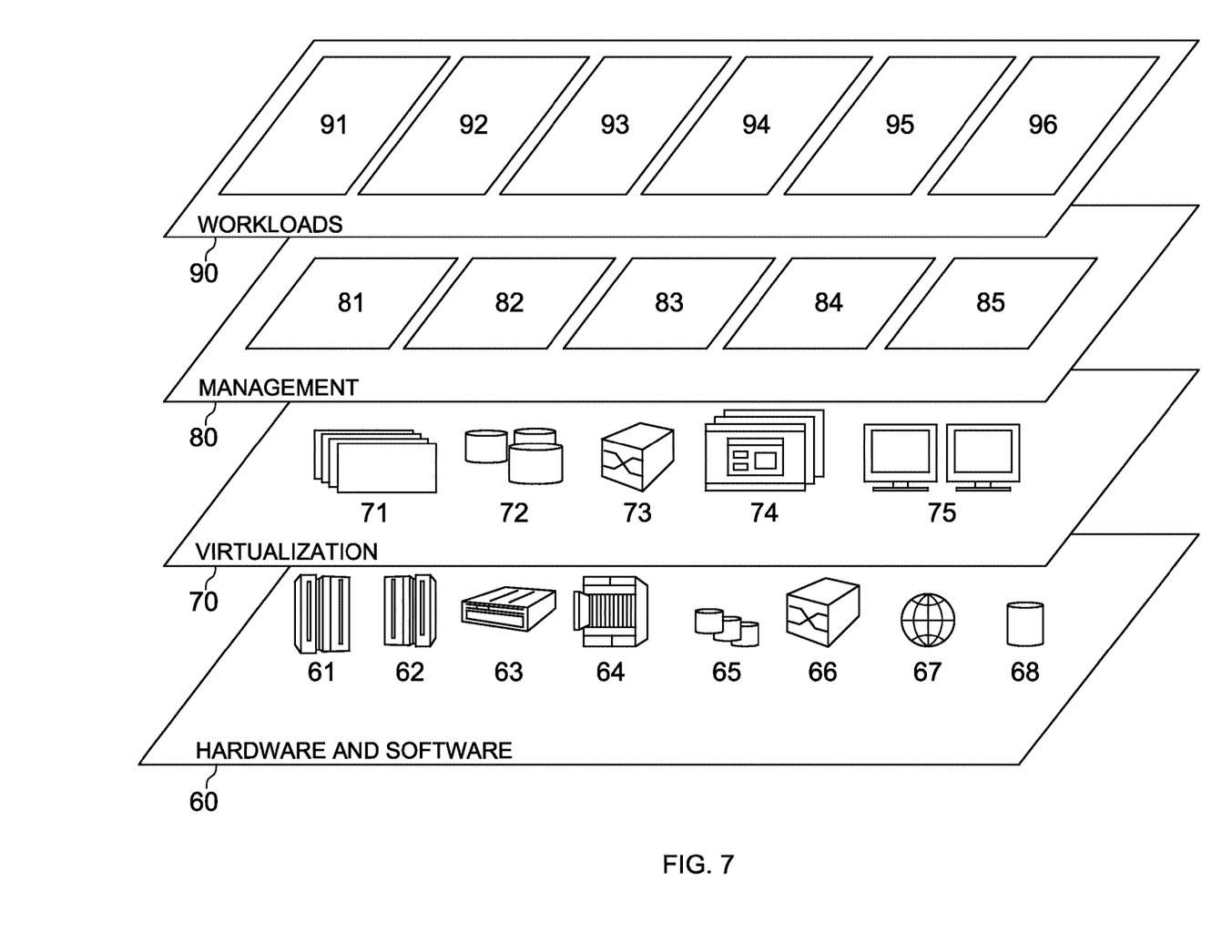
FIG. 7 depicts abstraction model layers, in accordance with an embodiment of the present invention.

Referring now to FIG. 7, a set of functional abstraction layers provided by cloud computing environment 50 (FIG. 6) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software testing environment 96.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as Follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   executing, by one or more computer processors, a test suite to test a computer program for a plurality of variables;
   collecting, by the one or more computer processors, a variable value for each variable of the plurality of variables at a predetermined location of the computer program for a test included in the test suite;
   determining, by the one or more computer processors, whether the test included in the test suite is successful;
   responsive to determining that the test is successful, recording, by the one or more computer processors, the variable value as part of a success value set;
   responsive to determining the test is not successful, recording, by the one or more computer processors, the variable value as part of a failure value set;
   calculating, by the one or more computer processors, a confidence metric for the variable value, wherein the confidence metric indicates a level of certainty in the correctness of the variable value and the calculating of the confidence metric comprises:
      responsive to encountering an assertion statement during the testing of the computer program, executing, by the one or more computer processors, the assertion statement;
      responsive to determining that an expression of the assertion statement evaluates to true, identifying, by the one or more computer processors, a first variable associated with the expression of the assertion statement and identifying a first variable value of the first variable;
      responsive to determining that the expression of the assertion statement evaluates to false, transforming, by the one or more computer processors, the expression of the assertion statement to its logical negation, identifying the first variable associated with the logical negation of the expression of the assertion statement, and identifying the first variable value;
   responsive to encountering a function exit during the testing of the computer program, determining, by the one or more computer processors, whether the first variable is within a scope of the function exit;
   responsive to determining that the first variable is within the scope of the function exit, incrementing, by the one or more computer processors, a confidence counter assigned to the first variable value; and
   responsive to determining that a write statement is encountered during the testing of the computer program, no longer incrementing, by the one or more computer processors, the confidence counter assigned to the first variable value;
   measuring, by the one or more computer processors, a relevance metric for each variable of the plurality of variables; and
   presenting, by the one or more computer processors, the failure value set, the success value set, the confidence metric for the variable value, and the relevance metric for each variable of the plurality of variables.

2. The method of claim 1, further comprising:
   responsive to the computer program undergoing an unexpected operational termination at a first location of the computer program, identifying, by the one or more computer processors, a second variable associated with a second location of the computer program and a second variable value associated with the second location of the computer program, wherein the second location of the computer program is a program location immediately preceding the first location;
   comparing, by the one or more computer processors, the second variable value with the variable value recorded in the success value set or the failure value set; and
   flagging, by the one or more computer processors, the second variable.

3. The method of claim 2, wherein the step of flagging the second variable comprises:
   determining, by the one or more computer processors, a likelihood the second variable caused the computer program to not operate as intended, based on a condition selected from the group of conditions consisting of: whether the failure value set includes the second variable value, whether the success value set does not include the second variable value, and whether one variable value included in the success value set having a low normalized occurrence is equal to the second variable value.

4. The method of claim 1, further comprising:
   responsive to encountering a function entry during the testing of the computer program, determining, by the one or more computer processors, whether the first variable is within a scope of the function entry;
   responsive to determining that the first variable is within the scope of the function entry, incrementing, by the one or more computer processors, the confidence counter assigned to the first variable value;
   responsive to encountering the function exit during the testing of the computer program, determining, by the one or more computer processors, whether the first variable is within a scope of the function exit; and responsive to determining that the first variable is within the scope of the function exit, incrementing, by the one or more computer processors, the confidence counter assigned to the first variable value.

5. The method of claim 1, wherein the step of calculating the confidence metric comprises:

summing, by the one or more computer processors, the value of the confidence counter for the first variable value with a number of occurrences associated with the first variable value.

6. The method of claim 1, wherein the relevance metric is calculated based on a Jaccard distance between the success value set and the failure value set, and wherein a value of 0 for the relevance metric indicates that the success value set and the failure value set are completely disjoint, and a value of 1 for the relevance metric indicates that the success value set and the failure value set are completely intersecting.

7. The method of claim 1, further comprising:

responsive to determining, that one variable value is not included in the success value set, identifying, by the one or more computer processors, the one variable value as potentially causing the computer program to not operate as intended, wherein the one variable value is either excluded from the success value set and the failure value set, or the one variable value is part of the failure value set.

8. The method of claim 7, further comprising:

responsive to determining that the one variable value is included in the success value set and has a relatively low number of occurrences, identifying, by the one or more computer processors, the one variable value as having a relatively lower likelihood for causing the computer program to not operate as intended.

9. The method of claim 7, further comprising:

responsive to determining that the one variable value is included in the failure value set and the success value set that completely intersect, identifying, by the one or more computer processors, the one variable value as having a low relevance.

\* \* \* \* \*